US005944218A

United States Patent [19]

Jenssen

[11] Patent Number: 5,944,218

[45] Date of Patent: Aug. 31, 1999

[54] TANK COVER FOR COVERING THE TANK SOCKET OF VEHICLE FUEL TANKS

[75] Inventor: Thomas Jenssen, Wedemark, Germany

[73] Assignee: Bernhard Mittelhäuser, Wedemark, Germany

[21] Appl. No.: 08/821,236

[22] Filed: Mar. 20, 1997

[30] Foreign Application Priority Data

Mar. 21, 1996 [DE] Germany ........................ 296 05 297 U

[51] Int. Cl.[6] ........................ B65D 43/14

[52] U.S. Cl. ........................ 220/840; 220/836; 296/97.22

[58] Field of Search ........................ 220/337, 338, 220/DIG. 33, 335, 836, 840; 296/97.22

[56] References Cited

U.S. PATENT DOCUMENTS 2,865,653 12/1958 Nixon ........................ 296/97.22 X
4,782,978 11/1988 Appleby et al. ........................ 220/335
5,165,749 11/1992 Sheppard ........................ 296/97.22

*Primary Examiner*—Stephen K. Cronin
*Attorney, Agent, or Firm*—Robert W. Becker & Associates

[57] ABSTRACT

A tank cover for a tank socket of a vehicle fuel tank has a flap and a pivot arm with a curved portion having a first and a second leg. The first leg is connected to the flap. The second leg includes a hinge component with which the second leg is connected to the vehicle such that the flap is pivotal about a first end. A support surface is positioned adjacent to the curved portion remote from the flap. When the flap is to be mounted, the curved portion rests on the support surface and is pivoted while being supported on the support surface for mounting the hinge component. The support surface, after mounting of the tank cover, is spaced at a preset distance from the curved portion.

4 Claims, 2 Drawing Sheets

TANK COVER FOR COVERING THE TANK SOCKET OF VEHICLE FUEL TANKS

BACKGROUND OF THE INVENTION

The present invention relates to a device for covering the tank socket with a cover comprising a curved pivot arm that is secured with a pivot joint or pin hinge at the vehicle.

The invention is based on devices in which the hinge parts and/or the neighboring construction parts are somewhat elastically deformable and, during mounting of the tank cover, snap into position for assembling the hinge.

It is known to use for mounting of the tank cover plier-like tools in order to assemble the hinge that secures the flap of the tank cover. These tools are required because the hinge is in a hidden position below the outer skin of the vehicle laterally adjacent to the tank socket.

It is an object of the invention to embody the aforementioned device such that mounting of the tank cover can be manually performed without requiring any tools.

SUMMARY OF THE INVENTION

The tank cover for a tank socket of a vehicle fuel tank according to the present invention is primarily characterized by:

A flap;

A pivot arm comprising a curved portion with a first and a second leg;

The first leg connected to the flap;

The second leg including a hinge component with which the second leg is connected to the vehicle such that the flap is pivotable about a first end;

A support surface positioned adjacent to the curved portion remote from the flap;

Wherein, when the flap is mounted, the curved portion rests on the support surface and is pivoted while being supported on the support surface for mounting the hinge component;

Wherein the support surface, after mounting the tank cover, is spaced from the curved portion at a preset distance.

The vehicle has preferably a recess in which the tank socket is positioned, and the support surface is located at the bottom of the recess. The pivot arm projects into the recess.

The hinge component is preferably positioned in a narrow portion of the recess.

The hinge component is preferably a pin and the narrow portion includes a cutout for receiving the pin.

The support surface is expediently concave.

The flap has expediently a free end opposite the first end, wherein the support surface has a first end portion proximal to the free end of the flap and a second end portion remote from the free end of the flap. The first end portion is closer to a plane in which the flap is positioned, when the tank cover is closed, than the second end portion.

Advantageously, the preset distance between the curved portion and the support surface is a narrow gap.

According to the present invention, adjacent to the curved portion of the pivot arm a support surface or abutment is provided that, for mounting of the tank cover, serves as a support for the pivot arm in order to perform the required pivot movement. During normal operation of the hinge of the tank cover, the support surface (abutment) is positioned at a preset distance to the pivot arm.

Accordingly, the assembly of the hinge components is carried out by a pivot movement corresponding essentially to the normal pivot movement of the tank cover for normal use. However, in order to be able to perform the insertion of the hinge components by slight elastic deformation of the hinge components and/or of the neighboring elements of the tank cover (i.e. the adjoining vehicle parts) by snapping into place, a support of the pivot arm on the abutment or support surface is necessary in order to perform the required pivot movement.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
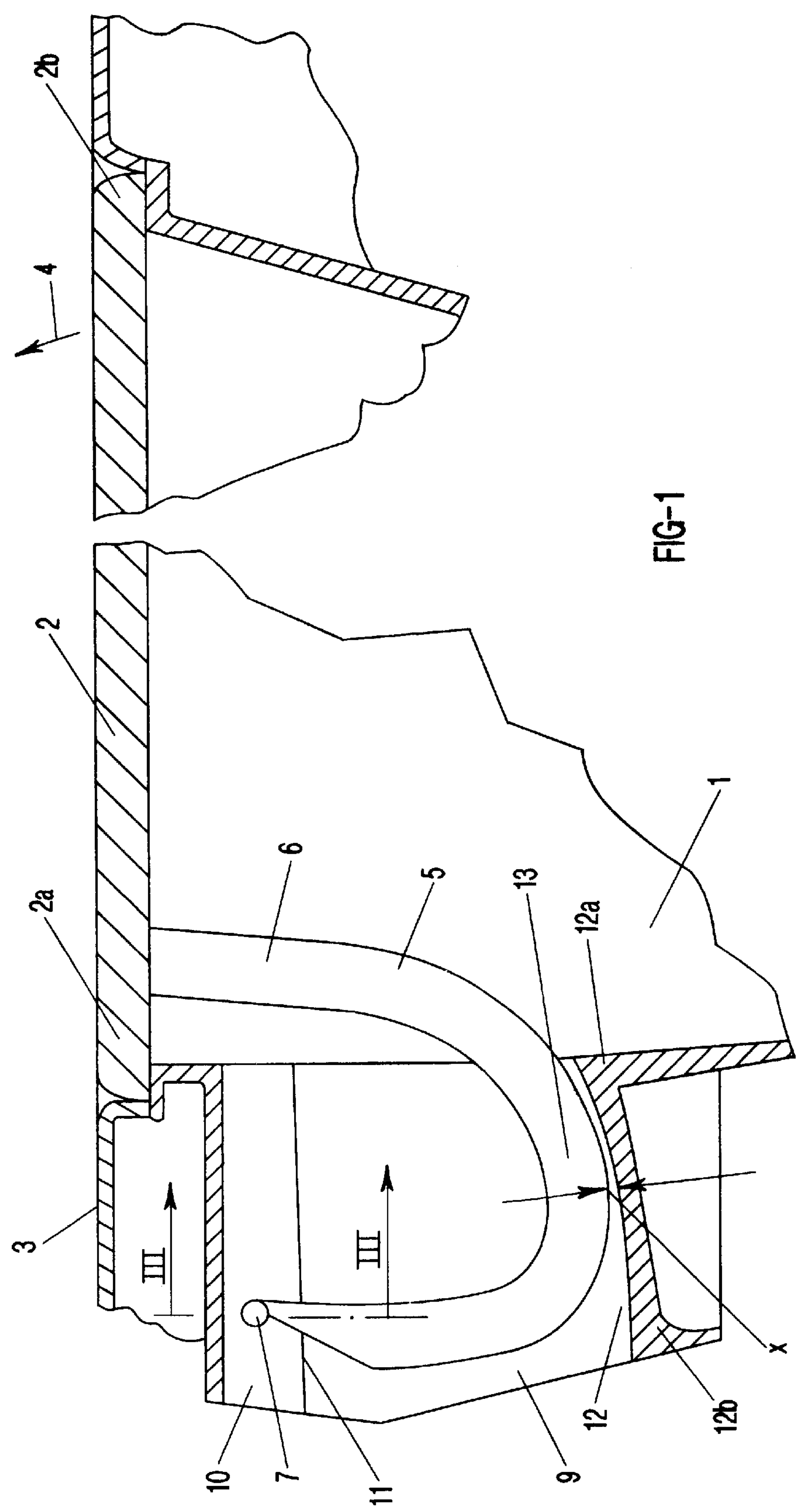
FIG. 1 is a part sectional view of a vehicle in the area of the tank socket and of the closed tank cover mounted thereat.
Figure 2:
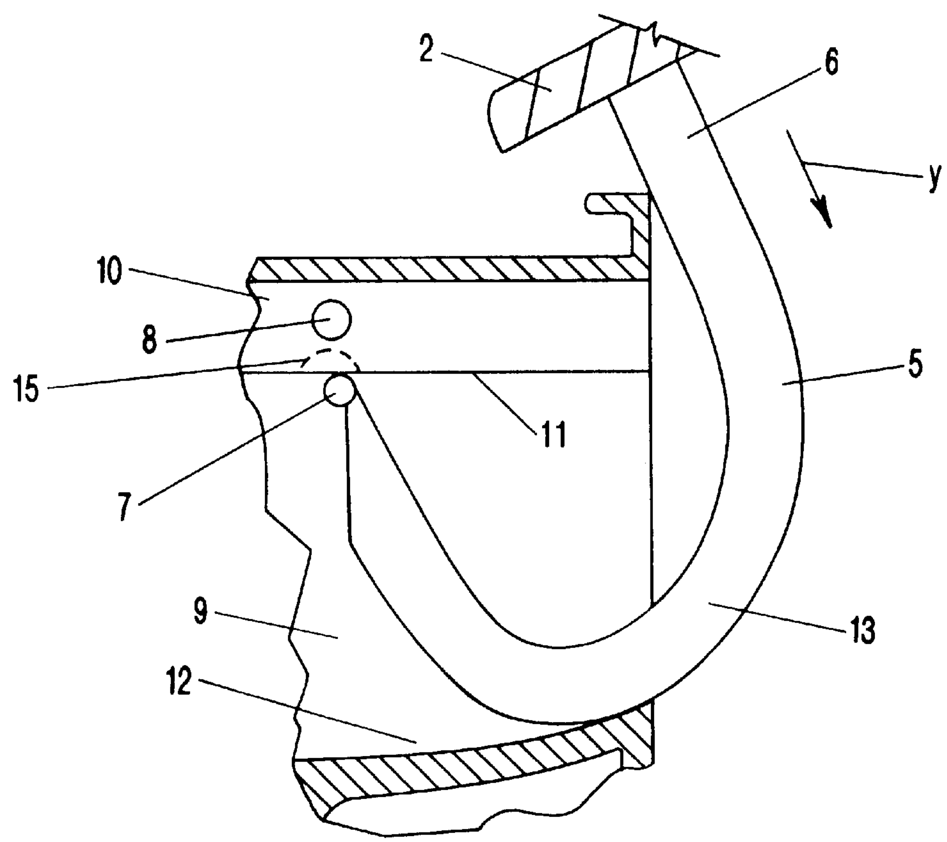
FIG. 2 shows a detail of FIG. 1 with the hinge not yet assembled.
Figure 3:
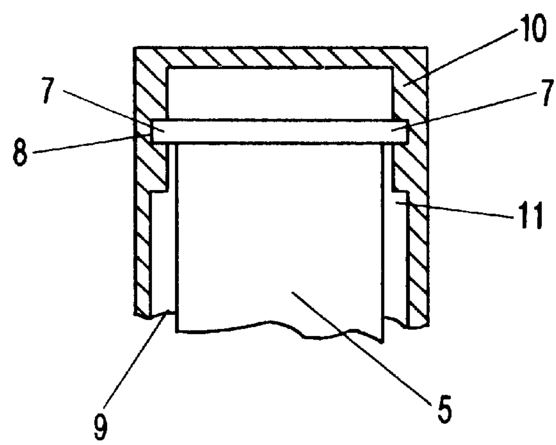
FIG. 3 shows a section along the line III—III of FIG. 1.

The present invention will now be described in detail with the aid of a specific embodiment utilizing FIGS. 1–3.

The non-represented tank socket with tank cover is arranged within a substantially funnel-shaped housing 1. The flap 2 covering the tank socket is flush with the exterior skin 3 of the vehicle. In order to be able to have access to the tank socket, the flap 2 is pivoted about the first end **2*a* in the direction of arrow 4**. A pivot movement of approximately 90° is possible.

The connection of the flap 2 to the vehicle is realized with a pivot arm 5 which is substantially in the shape of the letter J and which has one leg 6 that is connected to the inner side of the flap 2 at a first end **2*a*. At the free end of the leg 6 transversely projecting pins 7 are provided on opposite sides. The two pins 7 are aligned with one another and engage two blind holes 8 which are provided in a lateral recess 9 of the housing 1. The two blind holes 8 are located at the two sidewalls of this recess 9 in an edge portion 10 of greater wall thickness. The edge portion 10 has a step indicated by reference numeral 11**.

For mounting the tank cover the bottom 12 of the recess 9 is of a special design in order to provide a support surface. The bottom 12 is slightly concavely shaped and positioned relatively closely to the curved portion 13 of the pivot arm 5. The preset distance is indicated with reference letter x. This preset distance is only so great that an unimpeded pivoting of the flap 2 can be performed. On the other hand, the support surface 12 serves as an abutment for mounting the tank cover.

In a slightly pivoted state of the flap 2 (FIG. 2) relative to the adjoining vehicle surface, the curved portion 13 is placed onto the support surface 12 whereby the two pins 7 engage underneath the step 11. By manually applying pressure in the direction of arrow y, i.e., in the direction of pivoting of the flap 2 (closing movement), the sidewalls of the recess 9 and/or the pins 7, respectively, the adjacent parts of the pivot arm 5 will deform. Thus, the two pins 7 snap into the blind holes 8 whereby the desired pivot joint or hinge for the flap 2 is formed. Upon completion of the hinge, the parts 1 and 5 comprised of a hard but tenacious plastic material will return into their initial shape. Thus, the hinge is completed and the mounting of the tank cover including flap 2 is complete.

It should be noted that the concave embodiment of the surface 12 is especially advantageous, because the end portion 12*a* of the support surface 12 that is closer to the free end 2*b* of the flap 2 is closer to a plane defined by the closed flap than the opposite end portion 12*b*. This prevents sliding or an evasive movement of the curved portion 13 especially in the rearward direction when the manipulation according to FIG. 2 is to be performed. It is furthermore advantageous to provide the step 11 with a small cutout 15 in the vicinity of the blind hole 8. The person mounting the hinge will immediately find the correct alignment of the pins 7 relative to the holes 8, when the pivot arm 5 is to be positioned for mounting.

Adjacent to the edge portion 10 the sidewalls of the recess 9 are spaced from one another at such a distance that the pivot arm 5 can be introduced without obstruction into the recess 9. When the position represented in FIG. 2 has been reached, the actual mounting of the tank cover can begin.

The present invention is, of course, in no way restricted to the specific disclosure of the specifications, and drawings, but also encompasses any modifications within the scope of the appended claims.

What I claim is:

1. A tank cover for a tank socket of a vehicle fuel tank, wherein the vehicle has a recess in which the tank socket is positioned; said tank cover comprising:

a flap;

a pivot arm comprising a first leg, a second leg and a curved portion connecting said first leg and said second leg;

said first leg connected to said flap;

said second leg including pins for pivotably connecting said second leg to the vehicle such that said flap is pivotable about a first end;

said second leg and said curved portion projecting into the recess when said flap is closed;

wherein said pins are mounted in holes provided at a narrow portion of said recess;

wherein said narrow portion includes cutouts for receiving said pins and correctly aligning said pins with said holes for mounting;

a support surface located at a bottom of the recess;

wherein said support surface is positioned adjacent to said curved portion and remote from said flap;

wherein, for mounting said pins, said support surface is an abutment for said curved portion such that said curved portion rests on said support surface and is pivoted on said support surface in a direction of closing said flap, wherein pivoting of said curved portion automatically snaps said pins, aligned in said cutouts, into said holes;

wherein said support surface, after mounting said tank cover, is spaced from said curved portion at a preset distance.

2. A tank cover according to claim 1, wherein said support surface is concave.

3. A tank cover according to claim 1, wherein said flap has a free end opposite said first end, wherein said support surface has a first end portion proximal to said free end of said flap and a second end portion remote from said free end of said flap, wherein said first end portion is closer to a plane in which said flap is positioned when said tank cover is closed than said second end portion.

4. A tank cover according to claim 1, wherein said distance between said curved portion and said support surface is a narrow gap.

* * * * *

UNITED STATES PATENT AND TRADEMARK OFFICE

CERTIFICATE OF CORRECTION

PATENT NO. : 5,944,218
DATED : August 31, 1999
INVENTOR(S) : Thomas Jenssen

It is certified that error appears in the above-identified patent and that said Letters Patent is hereby corrected as shown below:

Title page,
Item [22] should read as follows:
[22] Filed: Mar. 21, 1997

Signed and Sealed this

Twenty-sixth Day of February, 2002

*Attest:*

JAMES E. ROGAN
*Director of the United States Patent and Trademark Office*

*Attesting Officer*